United States Patent [19]

Koda et al.

[11] 4,417,024

[45] Nov. 22, 1983

[54] FLUOROSILICONE-CONTAINING COMPOSITIONS FOR THE TREATMENT OF FIBERS

[75] Inventors: Yoshinobu Koda, Chiba; Isao Ona, Sodegaura; Atsushi Takeda, Ichihara, all of Japan

[73] Assignee: Toray Silicone Company, Ltd., Tokyo, Japan

[21] Appl. No.: 252,677

[22] Filed: Apr. 9, 1981

[51] Int. Cl.$^3$ ............................................. C08L 83/04
[52] U.S. Cl. .................................... 524/861; 524/588; 524/837; 524/770; 524/751; 524/773; 524/726; 524/765; 524/745; 528/18; 528/31; 528/42; 528/33
[58] Field of Search ....................... 528/18, 31, 42, 33; 260/18 S, 29 ZM, 30.4 SB, 32.8 SB, 33.2 SB, 31.2 R, 32.6 R; 524/588, 837, 770, 751, 773, 726, 765, 745

[56] References Cited

U.S. PATENT DOCUMENTS

| | | | |
|---|---|---|---|
| 2,950,317 | 8/1960 | Brown et al. | 260/543 |
| 3,012,006 | 12/1961 | Holbrook et al. | 260/46.5 |
| 3,015,585 | 1/1962 | Holbrook et al. | 117/161 |
| 3,455,878 | 7/1969 | Quaal | 528/31 |

FOREIGN PATENT DOCUMENTS

| | | |
|---|---|---|
| 47-38505 | 9/1972 | Japan . |
| 50-140388 | 11/1975 | Japan . |
| 1002095 | 3/1966 | United Kingdom . |
| 1123447 | 8/1968 | United Kingdom . |

*Primary Examiner*—Melvyn I. Marquis
*Attorney, Agent, or Firm*—George A. Grindahl

[57] ABSTRACT

Fiber-treating compositions are described which durably provide water repellency and oil repellency for the treated fiber. These compositions comprise a siloxane component bearing fluorinated hydrocarbon radicals, unsubstituted hydrocarbon radicals and silicon-hydride atoms, and a dehydrogenation condensation catalyst. Curing of the compositions occurs by a dehydrogenation condensation reaction between the silicon-hydride atoms and/or between the silicon-hydride atoms and the hydroxyl radical of an optionally added hydroxyl-endblocked organopolysiloxanes.

5 Claims, No Drawings

FLUOROSILICONE-CONTAINING COMPOSITIONS FOR THE TREATMENT OF FIBERS

BACKGROUND OF THE INVENTION

The present invention relates to silicone compositions for the treatment of fibers. More precisely, it concerns polysiloxane compositions which can impart water repellency and oil repellency to fiber materials.

Conventionally, water repellency is imparted to fiber materials using methylhydrogenpolysiloxane or dimethylpolysiloxane directly, or as an emulsion or solution in an organic solvent, a catalyst for curing and with subsequent heat treatment. In this case, the treated fiber materials actually demonstrate an effective water repellency, but their oil repellency is poor.

Therefore, a specific fiber treatment agent primarily consisting of fluorinated hydrocarbons is generally used in order to impart oil repellency to the fiber materials. In this case, this treatment agent is very expensive and the treatment process is very difficult because of a limitation of solvents for dilution. In addition, the drawback cannot be avoided that an undesirable feel is given to the treated fiber materials and in particular to fabrics for clothing.

In Kokai Japanese Pat. No. Sho 50(1975)-140388, it was proposed that a partially hydrolyzed condensation product of diorganopolysiloxanes having perfluoroalkyl-alkoxysiloxane and alkyl-alkoxysiloxane units and having OH groups at both ends can be used for dirt protection on inorganic materials such as slate slabs and tiles. However, it is actually very difficult for such a resin-like coating agent to penetrate into the interior of fiber materials. In terms of chemical composition, such an agent is completely different from the compositions of this invention.

In Japanese Pat. No. Sho 47(1972)-38505, it was proposed that a filter cloth having excellent durability with respect to twisting and excellent lubrication properties can be obtained by treating an inorganic fiber cloth with an organopolysiloxane containing trifluoromethyl-substituted aromatic groups. In this case, the obtained cloth lacks washing resistance and hot water washing resistance because of the noncuring nature of the treatment agent.

In Japanese Pat. No. Sho 42(1967)-2637, a method for imparting water repellency to the fibrous organic materials was proposed by the treatment of the fibrous materials with vapor of silanes containing perfluoroalkyl groups. According to this method, the control of the treatment process is very difficult and there is the drawback that retention and durability of the treatment effects are poor.

BRIEF SUMMARY OF THE INVENTION

It is an object of this invention to provide compositions which durably impart both oil repellency and water repellency to fiber materials. This object, and others which will be obvious upon considering the following disclosure and appended claims, are obtained by the present invention wherein a curable organopolysiloxane composition comprising a linear organopolysiloxane comprising silicon-atom-bound fluorinated hydrocarbon radicals, silicon-atom-bound unsubstituted hydrocarbon radicals and silicon-atom-bound hydrogen atoms is mixed with a dehydrogenation condensation catalyst and the resulting composition of this invention is applied to a fiber material.

DETAILED DESCRIPTION OF THE INVENTION

The present invention relates to a composition for the treatment of fibers, said composition being obtained by mixing components comprising (A) a siloxane component comprising (a) a substantially linear organohydrogenpolysiloxane which has at least 5 mol percent of $RQSiO_{2/2}$ units and at least three silicon-atom-bound hydrogen atom per molecule, wherein R denotes an unsubstituted monovalent hydrocarbon radical having from 1 to 6 carbon atoms and Q denotes a fluorinated monovalent hydrocarbon radical or (b) a mixture comprising (b)(1) a substantially linear organopolysiloxane which consists of from 5 to 100 mol percent of $RQSiO_{2/2}$ units and from 0 to 95 mol percent of $R'R''SiO_{2/2}$ units and which has a silicon-atom-bound hydroxyl radical at each terminus, wherein R and Q are as denoted above and R' and R'' denote unsubstituted monovalent hydrocarbon radicals and (b)(2) an organohydrogenpolysiloxane which has at least three silicon-atom-bound hydrogen atoms per molecule wherein the organic radicals are unsubstituted monovalent hydrocarbon radicals and (B) a curing catalyst component for dehydrogenation condensation between silicon-atom-bound hydrogen atoms or between silicon-atom-bound hydrogen atoms and silicon-atom-bound hydroxyl radicals.

The compositions of this invention form a cured film having both oil repellency and water repellency on fibers by the formation of cross-links by dehydrogenation due to the catalytic action of component (B) with component (A). Component (A) can be component (a) alone or a mixture of component (b)(1) and component (b)(2).

Component (a) is a component which imparts both oil repellency and water repellency. This component (a) contains at least three silicon-atom-bound hydrogen atoms per molecule. The cross-links are formed by dehydrogenation condensation due to the catalytic action of component (B) and a cured film is formed on the fiber surface. The silicon-atom-bound hydrogen atoms are present generally in the form of $RHSiO_{2/2}$ units, such as $(CH_3)(H)SiO_{2/2}$ units, in the molecular chain and/or in the form of $HR_2SiO_{1/2}$ units, such as $(H)(CH_3)_2SiO_{1/2}$ units, at the molecular chain terminals.

In the molecular chain, diorganosiloxane units having the formula $R'R''SiO_{2/2}$, such as $(CH_3)_2SiO_{2/2}$, can be present in addition to $RQSiO_{2/2}$ units and $RHSiO_{2/2}$ units; however, a satisfactory oil repellency cannot be obtained unless at least of 5 mol percent of $RQSiO_{2/2}$ units is present in the molecule.

Examples of R radicals in component (a) include alkyl radicals, such as methyl, ethyl, and propyl; alkenyl radicals, such as vinyl and allyl; and phenyl radicals.

Examples of Q radicals in component (a) include $CF_3CH_2CH_2$, $CF_3CF_2CH_2CH_2$, $CF_3CH_2CH_2CH_2$, $CF_3CF_2CH_2CH_2CH_2$, $(CF_3)_2CHCH_2$, $CF_3(C_6H_4)CH_2CH_2$, $CF_3(C_6H_4)$ and $CF_3CF_2CF_2(C_6H_4)CH_2CH_2$.

Examples of R' and R'' radicals in component (a) include alkyl radicals, such as methyl, ethyl and octyl; alkenyl radicals such as vinyl and allyl; aryl radicals, such as phenyl and tolyl; and arylalkyl radicals, such as benzyl and beta-phenylethyl. R' and R'' can denote the same or different radicals.

In addition to $HR_2SiO_{1/2}$ units component (a) can be endblocked with other units such as $R_3SiO_{1/2}$ units, such as $(CH_3)_3SiO_{1/2}$ units, $(CH_2\!=\!CH)(CH_3)(C_6H_5)SiO_{1/2}$ units and $(CH_3)_2(C_6H_5)SiO_{1/2}$ units; and $R_2QSiO_{1/2}$ units, such as $(CF_3CH_2CH_2)(CH_3)_2SiO_{1/2}$ units and $(CF_3CH_2CH_2)(CH_3)(CH_2\!=\!CH)SiO_{1/2}$ units.

Examples of $RQSiO_{2/2}$ units in the molecular chain of component (a) include $(CF_3CH_2CH_2)(CH_3)SiO_{2/2}$ units, $(CF_3CH_2CH_2)(C_6H_5)SiO_{2/2}$ units, $(CF_3CH_2CH_2)(CH_2\!=\!CH)SiO_{2/2}$ units, $(CF_3CF_2CH_2CH_2)(CH_3)SiO_{2/2}$ units and $(CF_3C_6H_4)(CH_3)SiO_{2/2}$ units.

Examples of $R'R''SiO_{2/2}$ units in component (a) include $(CH_3)_2SiO_{2/2}$ units, $(CH_3)(C_6H_5)SiO_{2/2}$ units, $(CH_3)(CH_2\!=\!CH)SiO_{2/2}$ units, $(C_6H_5)_2SiO_{2/2}$ units, $(C_6H_5)(CH_2\!=\!CH)SiO_{2/2}$ units and $(CH_3)(C_6H_5CH_2)SiO_{2/2}$ units.

Component (a) can be prepared by any of the well-known methods for preparing endblocked polydiorganosiloxanes. For example, a suitable mixture of hydrolyzable silanes, such as $(CF_3CH_2CH_2)(CH_3)SiCl_2$, $(CH_3)(H)SiCl_2$ and $(CH_3)_3SiCl$ can be cohydrolyzed and equilibrated under the influence of silanol-condensing and siloxane-equilibrating catalyst. Alternatively, a suitable mixture of cyclosiloxanes and endblocked siloxanes, such as $\{(CF_3CH_2CH_2)(CH_3)SiO\}_3$, $\{(CH_3)(H)SiO\}_4$ and $(CH_3)_3SiOSi(CH_3)_3$ can be equilibrated under the influence of a siloxane-equilibrating catalyst.

By the expression that component (a) is substantially linear it is meant that it is completely linear, i.e. consisting only of molecular chain silicon atoms linked by only 2 oxygen atoms and terminating silicon atoms linked by only one oxygen atom; or only slightly branched, i.e. further comprising only trace amounts of silicon atoms linked by three or four oxygen atoms.

Component (a) is generally a liquid at room temperature and preferably has a viscosity of from 20 to 100,000 centistokes at 25° C.

Component (a) is generally used alone; however, it can be used as a mixture with a diorganopolysiloxane having silicon-atom-bound hydroxyl radicals at each terminus, i.e. a hydroxyl-endblocked polydiorganosiloxane. Examples of hydroxyl-endblocked polydiorganosiloxane include component (b)(1) delineated below and siloxanes having the formula $HO(R'R''SiO)_xH$ wherein x is a positive integer and R' and R" are as delineated above.

Component (b), which can be used alternatively to component (a), is a mixture comprising components (b)(1) and (b)(2). Like component (a) component (b)(1) confers both oil repellency and water repellency to treated fibers. Component (b)(2) is the crosslinking agent for component (b)(1), said crosslinks being formed between silicon-atom-bound hydrogen atoms and silicon-atom-bound hydroxyl radicals under the influence of component (B) to form a cured film on the fiber surface.

Component (b)(1) is a substantially linear organopolysiloxane, where the expression substantially linear is as defined above for component (a), and can range from a freely flowing liquid to a slowly flowing gum at room temperature.

As with component (a), component (b)(1) must have at least 5 mol percent of $RQSiO_{2/2}$ units in its molecular chain in order to provide a satisfactory oil repellency for a treated fiber. All siloxane units in component (b)(1) can be $RQSiO_{2/2}$ units. Any siloxane units in component (b)(1) which are not $RQSiO_{2/2}$ units are $R'R''SiO_{2/2}$ units. Examples of $R'R''SiO_{2/2}$ units and $RQSiO_{2/2}$ in component (b)(1) are as noted above for component (a).

Component (b)(1) can be prepared by any of the well-known methods for preparing hydroxyl-endblocked polydiorganosiloxanes. Typically a hydrolyzable silane; such as $RQSiCl_2$, such as $(CF_3CH_2CH_2)(CH_3)SiCl_2$, or a mixture of hydrolyzable silanes; such as $RQSiCl_2$ and $R'R''SiCl_2$, such as $(CF_3CH_2CH_2)(CH_3)SiCl_2$ and $(CH_3)_2SiCl_2$, is hydrolyzed in a solvent and the hydrolyzate condensed in the presence of a silanol-condensing catalyst.

Component (b)(2) is a cross-linking agent for component (b)(1). Examples of this component are organohydrogenpolysiloxanes in which both terminals are capped with organic groups, such as $(CH_3)_3SiO\{(CH_3)(H)SiO\}_xSi(CH_3)_3$, diorganosiloxane/organohydrogensiloxane copolymers in which both terminals are capped with organic groups, such as $(CH_3)_3SiO\{(CH_3)_2SiO\}_x\{(CH_3)(H)SiO\}_ySi(CH_3)_3$, organohydrogenpolysiloxanes having silicon-atom-bound hydrogen atoms at both terminals, such as $(H)(CH_3)_2SiO\{(CH_3)(H)SiO\}_x\{(CH_3)_2SiO\}_ySi(CH_3)_2H$ and organohydrogencyclicpolysiloxanes, such as $\{(CH_3)(H)SiO\}_x$. Examples of the organic groups in (b)(2) are generally methyl groups, phenyl groups and vinyl groups. This component is generally in a liquid form at room temperature wherein x and y are positive integers. Organohydrogenpolysiloxanes are well known in the silicone polymer art and need no further elaboration here as to composition and/or to methods of preparation.

The amount of component (b)(2) is preferably an amount which is sufficient to give silicon-atom-bound hydrogen atoms in a molar proportion greater than the molar proportion of the silicon-atom-bound hydroxyl groups in component (b)(1).

Component (B) is an indispensable component for cross-link formation among components (a) or among component (b)(1) and component (b)(2). Examples of this component include acid salts of heavy metals, such as tin, lead, zirconium, zinc, iron and manganese. In particular, carboxylic acid salts, titanic acid esters and platinic acid salts are preferred.

Examples of these acid salts include dibutyltin diacetate, dibutyltin dilaurate, dioctyltin dilaurate, dibutyltin dioctylate, tin octylate, tin dioctylate, diisooctylic acid mercaptoacetate, zinc octylate, zirconium naphthenate, manganese naphthenate, iron naphthenate, tetrabutyl orthotitanate and chloroplatinates.

Component (B) is generally used in an amount of 0.1 to 20 parts by weight to 100 parts by weight of component (A). An appropriate proportion can be selected according to the types and amounts of functional groups in component (A) and the curing conditions. In particular, it can be appropriately selected according to the temperature that is used to cure component (A).

The compositions of this invention for the treatment of fibers are easily produced simply by mixing component (a) and component (B), or by mixing component (b) consisting of components (b)(1) and (b)(2), and component (B).

When fiber materials are treated with the compositions of this invention, the treatment is preferably carried out in a solution using an appropriate diluent such as acetone, methyl ethyl ketone, methyl isopropyl ketone, diethyl ketone, cyclohexanone, acetylacetone, tetrahydrofuran, dioxane, ethyl acetate, propyl acetate, butyl acetate, amyl acetate, methyl propionate, ethyl propionate, dimethylformamide, dimethylacetamide and methyl Cellosolve ® acetate. In some cases, other solvents which are commonly used for organopolysiloxanes, such as toluene, xylene, isopropyl alcohol and hexane, can be mixed with the above-mentioned solvents in an appropriate amount.

In addition, water and an appropriate surfactant, for example, selected from among higher alcohol sulfates, alkylbenzenesulfonates, higher alcohol polyoxyalkylene adducts, higher fatty acid polyoxyalkylene adducts, alkylphenol polyoxyalkylene adducts and fatty acid ester polyoxyalkylene adducts, can be added to the compositions of this invention as a diluent and the obtained emulsions applied to the fiber materials.

The compositions of this invention, or their dilute solutions in an organic solvent or their emulsions are used for the treatment of fiber materials following common methods which are generally used as fiber treatment processes. For example, processes such as immersion, roller-coating or spraying are applicable. If desirable, the treatment is carried out with heating. As a result, durable water repellency and oil repellency can be imparted to the surface of fiber materials or within the interior layer of fiber materials.

As additional effects, a mold-release property and pliability can be imparted to the fiber materials. The fiber materials specified in this invention may be natural fibers such as wool, silk, cotton, flax, asbestos, regenerated fibers such as rayon and acetate, synthetic fibers such as polyesters, polyamides, polyvinyl alcohols, polyacrylics and polyolefins, and other fibers, such as glass fibers. The compositions of this invention are applicable to these fiber materials in various forms such as fibers, filaments, knitted materials, woven fabrics, and nonwoven fabrics. Preferably, it is most effective to carry out the treatment continuously on sheet forms such as knitted fabrics and nonwoven fabrics. In particular, in the case of nonwoven fabrics, other binders such as styrene-butadiene rubber latex and nitrile rubber latex can be also added.

The present invention will be further explained in the following examples. "Parts" indicated in the examples denotes "parts by weight". Me in the structural formula of organopolysiloxane indicates a methyl group.

EXAMPLE 1

An organopolysiloxane expressed by the following structural formula

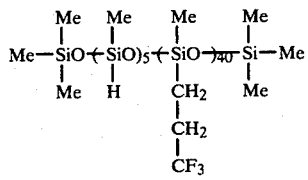

having a viscosity of 3,500 cSt at 25° C. (2 parts) was dissolved in methyl ethyl ketone (97.8 parts). Subsequently, dibutyltin dilaurate (0.2 parts) was added and dissolved uniformly in the solution to provide treatment solution A. For a comparison, a dimethyl/methylhydrogenpolysiloxane having the same degree of polymerization as that of the polysiloxane of this invention shown in the above-mentioned structural formula was dissolved in toluene and a catalyst was added to provide a comparative treatment solution B.

Subsequently, a piece of Tetoron (polyethylene terephthalate) taffeta (plain woven fabric; 50 denier; 10×10 cm) which had been scoured for desizing was immersed in the respective treatment solutions. The immersed piece was dried by squeezing using a mangle roller to such a degree that the amount of silicon adhered was 2 wt%.

Subsequently, cross-links were formed by the dehydrogenation condensation reaction by heating at 150° C. for 6 minutes. The treated cloth was stretched at an angle of 45° and ASTM No. 2 oil and water were dropped on the cloth.

The cloth treated with the composition of this invention demonstrated excellent water repellency and oil repellency as shown in Table I.

TABLE I

| Fluid | Cloth treated with treatment solution A (this invention) | Cloth treated with treatment solution B (comparative Example) |
|---|---|---|
| Drops of ASTM No. 2 oil | high water repellency no stains | instantaneous absorption of oil many stains |
| Drops of water | high water repellency | high water repellency |

EXAMPLE 2

An organopolysiloxane having the following structural formula:

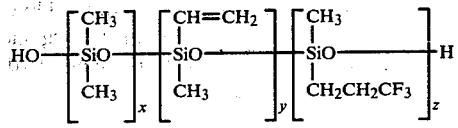

where x:y:z (molar ratio) was 10:3:87, and which had a viscosity of 3,000,000 cSt (100 parts), and a methylhydrogenpolysiloxane of which both terminals were capped with trimethylsilyl groups and which had a viscosity of 30 cSt (5 parts) were dissolved in methyl isobutyl ketone (300 parts) by stirring. Subsequently, dibutyltin diacetate (3 parts) was added to provide treatment solution C. Two pieces of asbestos plate with a length of 100 mm, a width of 50 mm and a thickness of 3 mm were immersed in this treatment solution C for one minute. The pieces were lifted out of the treatment solution C and the solvent was evaporated. Subsequently the pieces were placed in a hot air dryer at 150° C. for curing for 10 minutes. As a result, a firm glossy protective film was formed on the surface of the asbestos plate. A commercial adhesive tape for wrapping was stretched over the treated plate and a load of 20 g/cm² was applied to the tape. After leaving the sample at room temperature for 20 hours, the tape had not adhered on the surface of the plate at all.

The other piece of the treated plate was immersed in ASTM No. 1 oil for 5 weeks. Thereafter, the piece was cut and the cut surface was examined for blackening due to the permeation of oil. No evidence of permeation of oil was found.

EXAMPLE 3

A piece of Tetoron taffeta as in Example 1 was treated with treatment solution C under the same conditions as in Example 1. The resulting oil repellency and water repellency were as excellent as those shown in Table I.

EXAMPLE 4

A glass fiber fabric was treated with treatment solution A under the same conditions as in Example 1. The resulting oil repellency and water repellency were excellent.

That which is claimed is:

1. A composition for the treatment of fibers, said composition being obtained by mixing components comprising
   (A) a siloxane component comprising
   (a) a substantially linear organohydrogenpolysiloxane which has at least 5 mol percent of $RQSiO_{2/2}$ units and at least three silicon-atom-bound hydrogen atoms per molecule, wherein R denotes an unsubstituted monovalent hydrocarbon radical having from 1 to 6 carbon atoms and Q denotes a fluorinated monovalent hydrocarbon radical, or
   (b) a mixture comprising
      (b)(1) a substantially linear organopolysiloxane which consists of from 5 to 100 mol percent of $RQSiO_{2/2}$ units and from 0 to 95 mol percent of $R'R''SiO_{2/2}$ units and which has a silicon-atom-bound hydroxyl at each terminus, wherein R and Q are as denoted above and R' and R" denote unsubstituted monovalent hydrocarbon radicals, and
      (b)(2) an organohydrogenpolysiloxane which has at least three silicon-atom-bound hydrogen atoms per molecule wherein the organic radicals are unsubstituted monovalent hydrocarbon radicals, and
   (B) a curing catalyst component for dehydrogenation condensation between silicon-atom-bound hydrogen atoms or between silicon-atom-bound hydrogen atoms and silicon-atom-bound hydroxyl radicals.

2. A composition according to claim 1 wherein component (A) is an organohydrogenpolysiloxane having the formula

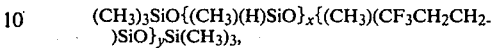

and a viscosity of from 20 to 100,000 centistokes at 25° C., wherein x and y are positive integers.

3. A composition according to claim 1 wherein component (A) is a mixture of an organopolysiloxane having the formula

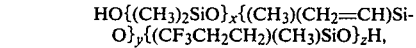

and a viscosity of from a freely flowing liquid to a slowly flowing gum at 25° C., wherein x, y and z are positive integers, and a methylhydrogenpolysiloxane having the formula

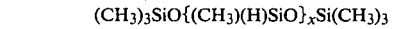

and a viscosity of from 5 to 50 centistokes at 25° C. and x is a positive integer.

4. A composition according to claims 1, 2 or 3 wherein component (B) is an acid salt of tin selected from the group consisting of dibutyltin diacetate, dibutyltin dilaurate, dibutyltin dioctylate, tin dioctylate and dioctyltin dilaurate and is present in the composition in an amount of from 0.1 to 20 parts by weight for every 100 parts by weight of component (A).

5. A composition according to claims 1, 2 or 3 further comprising an organic solvent or water containing a surfactant as a diluent.

* * * * *